(12) United States Patent
Barth et al.

(10) Patent No.: US 10,094,073 B2
(45) Date of Patent: Oct. 9, 2018

(54) WATER-PERMEABLE GROUND GRID FOR PAVINGS

(71) Applicant: Purus Plastics GmbH, Arzberg (DE)

(72) Inventors: Andree Barth, Marktschorgast (DE); Jürgen Manzei, Marktredwitz (DE)

(73) Assignee: Purus Plastics GmbH, Arzberg (DE)

( * ) Notice: Subject to any disclaimer, the term of this patent is extended or adjusted under 35 U.S.C. 154(b) by 0 days.

(21) Appl. No.: 15/538,416

(22) PCT Filed: Sep. 22, 2015

(86) PCT No.: PCT/DE2015/100398
§ 371 (c)(1),
(2) Date: Jun. 21, 2017

(87) PCT Pub. No.: WO2016/107621
PCT Pub. Date: Jul. 7, 2016

(65) Prior Publication Data
US 2017/0328015 A1    Nov. 16, 2017

(30) Foreign Application Priority Data
Dec. 28, 2014  (DE) .................... 20 2014 106 285 U

(51) Int. Cl.
*E01C 5/00*  (2006.01)
*E01C 3/00*  (2006.01)
*E01C 9/00*  (2006.01)
(Continued)

(52) U.S. Cl.
CPC .............. *E01C 5/001* (2013.01); *E01C 3/006* (2013.01); *E01C 9/004* (2013.01); *E02D 29/124* (2013.01);
(Continued)

(58) Field of Classification Search
CPC .......... E01C 5/001; E01C 3/006; E01C 9/004; E01C 9/08; E01C 2201/12; E01C 2201/20; E02D 29/124; E02D 17/20
See application file for complete search history.

(56) References Cited

U.S. PATENT DOCUMENTS 4,440,818 A * 4/1984 Buchan .................. E01C 5/005
428/117
5,443,545 A 8/1995 Weber
(Continued)

FOREIGN PATENT DOCUMENTS

DE            92 08 359 U1   10/1992
DE    10 2004 060 822 A1    7/2006
(Continued)

*Primary Examiner* — Abigail A Risic
(74) *Attorney, Agent, or Firm* — David S. Safran

(57) ABSTRACT

A plastic multipurpose component that is suitable as a building block and is filled with filling bodies is used to form a sheet-like assembly from a plurality of components. The multipurpose component has double-walled outer frame parts (2) with an outer frame wall, an inner frame wall and a tread surface connecting them, at least one coupling device (6, 8) for connecting two adjacent components being provided on each of the outer lateral surfaces thereof. Where appropriate inner walls (4) divide the interior of the outer frame (2) formed by outer frame parts into a pattern of cellular lead-throughs (6). Inner bottom support frames (11), and where appropriate, bottom transverse struts on the double-walled outer frame and inner frame serve for stabilizing and supporting at least one filling body introduced in the plastic multipurpose part.

9 Claims, 9 Drawing Sheets

(51) Int. Cl.
*E01C 9/08* (2006.01)
*E02D 17/20* (2006.01)
*E02D 29/12* (2006.01)

(52) U.S. Cl.
CPC ............ *E01C 9/08* (2013.01); *E01C 2201/12* (2013.01); *E01C 2201/20* (2013.01); *E02D 17/20* (2013.01)

(56) References Cited

U.S. PATENT DOCUMENTS

| | | | | |
|---|---|---|---|---|
| 5,527,128 A * | 6/1996 | Rope | ........................ | E01C 5/20 404/35 |
| 7,114,298 B2 * | 10/2006 | Kotler | ...................... | E01C 5/20 52/177 |
| 7,571,572 B2 * | 8/2009 | Moller, Jr. | ................ | E01C 5/20 404/41 |
| 8,734,049 B1 * | 5/2014 | Stiles | ...................... | E01C 11/24 404/36 |
| 9,249,570 B2 * | 2/2016 | Jean | ........................ | E04B 5/023 |
| 9,670,624 B1 * | 6/2017 | Stiles | ...................... | E01F 9/553 |
| 2003/0136070 A1 | 7/2003 | Ku | | |
| 2009/0094918 A1 * | 4/2009 | Murphy | .................... | E01C 5/20 52/387 |
| 2013/0287493 A1 * | 10/2013 | Rusch | ...................... | E01F 9/06 404/13 |
| 2014/0270945 A1 * | 9/2014 | Bach | ........................ | E01C 5/20 404/36 |

FOREIGN PATENT DOCUMENTS

| | | |
|---|---|---|
| DE | 10 2006 052 286 A1 | 2/2008 |
| EP | 0 576 939 A1 | 1/1994 |
| JP | 10-68101 A | 3/1998 |
| WO | 2010/102614 A1 | 9/2010 |

* cited by examiner

WATER-PERMEABLE GROUND GRID FOR PAVINGS

BACKGROUND OF THE INVENTION

Field of the Invention

The present invention relates to a multipurpose structural component made of plastic material that is suitable for being filled with filling bodies, such as stones, and for being laid out as a planar assembly that is comprised of multiple structural components.

Description of Related Art

Such structural components are already known from European Patent EP0576939 (B1) and corresponding U.S. Pat. No. 5,443,545, the disclosure of which is incorporated by reference in its entirety. What is described therein is a multipurpose structural component that has a circumferential exterior frame, with respectively at least one coupling device for connecting two adjacent structural components being provided on its lateral surfaces, and transverse as well as longitudinal walls being provided by which the inside of the exterior frame is divided into a grid of individual cell-like lead-throughs.

The multipurpose structural component has been used as a module of a modular system, so to speak, wherein it is suitable for the most varied application purposes. The structural component is usable as a component of a greening, in particular as a path or a walkable surface in greened areas without any special grounding or gravel bed, such as, e.g., a parking lot, an arena, a work area, a sports field, or the like. For this purpose, the structural component can, e.g., be installed on the ground and subsequently filled with a substrate—optionally also partially with plant elements—and installed. The inner walls in connection with the exterior frame create a high rigidity of the structural component, and thus make it particularly tread-resistant. Moreover, the structural component can likewise serve as a part of a side fortification for road ditches or for planting walls, wherein any sinking away and undercutting or washing off is effectively limited in the tread area.

The known structural component can be used for different purposes, e.g., as a ground stabilizer for sports fields, parking lots, runways, or parks, but also for hillsides and other kinds of sloped terrain. Here, it allows for being laid out quickly without requiring an elaborate substructure, which is entirely sufficient, in many cases. However, it is also usable on a substructure. It is greenable.

In order to create a surface that can be walked or driven on, it is provided in known structural components that the longitudinal and transverse walls, at least with the upper side which forms the walkable surface, are flush with the frame. It is also advantageous if the surface of the partitions is not smooth in order to avoid any slipping on these partitions. Thus, knobs can be provided on the surface, e.g. Among other things, the special coupling device has the advantage that it can also be formed already in the course of the forming procedure, while at the same time ensuring a particularly simple option for connecting individual structural components to each other. The only thing that needs to be done is to plug the two structural components together at their common lateral surfaces at the respective hook part and at the feed-through.

A particularly good tread resistance or trafficability while the connection points of two structural components are subjected to loads is ensured by the fact that at least the bottom side of the hook part is flush with the bottom side of the exterior frame. However, the known structural component is only designed for purposes of securing the ground. But, it is often desired to lay out paved/tiled surfaces alternatingly with grass pavers, and to avoid that the surface is sealed. Here, it is desired for any moisture to be drained quickly. What results in this way are e.g., dry pavings that can be walked on without any problems, and on which no ice film or bio film is formed. When it comes to applications in areas with temporarily strong rainfall patterns, the applied moisture is supposed to drain off preferably immediately, so that the valuable top soil is not washed away, and thus, any sealing of the ground is counteracted.

SUMMARY OF THE INVENTION

It is the object of the present invention to improve the generic structural component in such a manner that it opens the possibility of laying out paving, stones, and the like, wherein the disadvantages of the known structural components are avoided.

According to the invention, this problem is solved by a generic structural component which facilitates good seeping through of water between the filling material (e.g., paving/tiles) and the multipurpose structural component is made of plastic material. The multipurpose structural component may be filled with filling bodies, such as paving stones, shaped concrete bricks, artificial stones, wood-block paving, and the like. Where appropriate, it may also comprise an illumination device.

Here, the multipurpose structural components can have a circumferential double walled fringe, whereby doubled double wall structures are created when the surfaces are laid out. But, it is also possible to only partially provide the multipurpose structural components with double wall exterior frame parts, so that only a double wall structure is created between two structural components when they are assembled.

The multipurpose structural component is suitable for the temporary as well as permanent stabilization of surfaces and paths, such as for events that take place in agricultural terrain (polo games, equestrian games, golf), parking lots, and the like—even without the subsurfaces (sand bed, gravel etc.) having to be prepared in a correspondingly elaborate manner. Where desired, the multipurpose structural component also can be partially provided with planting units. Due to the fact that lead-throughs are formed in the double walls and that there is no full planar support of the filling material at the ground of the part by the support floor frame, a very good water-draining behavior can be achieved as compared to the customary asphalted and sealed surfaces. The double exterior walls made of (elastic) plastic material additionally facilitate an elastic behavior of the entire structural component, as they can be pressed together and can also be pulled apart, where necessary. In this manner, thermal tensions as well as mechanical loads of the laid out plates can be absorbed. For example, a polyethylene plastic material plate with a side length of approximately 33 cm expands in the sun by 2-3 mm, which in large surfaces causes the attachment plates to bulge and break if there is no tension compensation.

It is also crucial that the differences in expansion, which may, e.g., occur in the course of a day due to sunlight and shade, are compensated in every direction without the laid out grid bulging or tearing. Thus, the exterior frame double walls serve as an expanding and bending reserve. In this way, their elasticity is similar to that of natural soil. Such a behavior is especially desired in paved parking spaces or paths to facilitate permanent placement. It is also possible to use elastic stepping stones, e.g., ones made of polyurethane or cork, as a filling, and to thus facilitate that the surfaces can be walked on in a joint-friendly manner.

Another possibility is to use bright stones that either comprise phosphorescent material or are provided with LEDs to indicate the desired direction during nighttime. Likewise, colorful filling bodies that are variously colored or printed can be inserted, which may serve for the purpose of marking or advertising.

At that, all suitable coupling devices, as they are familiar to a person skilled in the art are usable between the structural components. Herein, they are described based on a combination of hooks and openings, but they are by no means limited to this option.

When the known combination of hooks and openings is used at the exterior surfaces of the multipurpose structural components, the lock hook can be inserted into a double wall exterior frame part while maintaining a smooth inner wall due to the fact that a recess is provided in the area of the internal side of the exterior frame outer wall, where desired. If necessary, the exterior frame inner wall can have a window for receiving the lock hook. However, beyond that, the lock hook is not supposed to form any projection on the internal side of the exterior frame inner wall, since what is desired is an inner wall that is as smooth as possible to ensure that the filling material can be readily inserted.

The structural component may be molded in a simple manner from plastic materials, wherein the construction of the structural component is carried out in such a manner that raw plastic material, but also ground-down as well as molten-down plastic material waste (where necessary also together with additional components), can be injected or poured in a simple manner. Consequently, the structural component can represent an active contribution to the management of plastic material waste, which is regularly produced in large quantities, e.g., as a result of faulty dyeing in injection molding plants. A complete processing of mass plastic material waste (e.g., of packaging material sacks, shrink hoods, etc.) from polyethylene (low-pressure and high-pressure PE) or polypropylene is still very elaborate and cost-intensive. As a result, such actually clean and usable plastic material waste still regularly ends up in waste incineration plants. Now, it can be used in a purposeful manner. However, the structural component can also be made of biodegradable plastic material, e.g., if it is desired that the growth in girth of the plants that are placed therein is not limited, and if the support function of the structural component is necessary or desired only for a certain period of time until the plants have sufficiently taken root. In one embodiment, what is used according to the invention as the material of the structural component or the connection element is a plastic material comprised of a plastic material mixture that contains thermoplastically moldable plastic material waste, which can preferably be injected or poured into a mold. This may, e.g., be waste that mainly contains granulated or ground polyethylene (low-pressure and high-pressure PE) or polypropylene. As for these, they can, e.g., no longer be blown, but they can nonetheless still be injection-molded or poured. But also, polyamides, polyurethanes or polyesters can be successfully mixed in. Further, the plastic material mass may comprise a share of wood or cardboard waste or porous aggregates, which are, e.g., suitable for considerably reducing the weight of the structural component according to the invention. However, the structural component also can be molded in a conventional manner.

In a preferred embodiment, the plastic material is made of previously shredded and subsequently melted-down plastic material waste that can be molded into a corresponding shape. Due to its special shape, the structural component according to the invention can be manufactured in a simple manner from the injection-technological point of view. Expediently, the plastic material mass can also comprise an additional share of filling materials, such as paper or cardboard waste. The plastic material can be selected from the group comprising: unprocessed plastic material, recycled plastic material, fiber-reinforced plastic material, filled plastic materials, biodegradable plastic materials.

Appropriately, both side walls of the hollow exterior wall converge in a trapezoidal manner from the bottom toward the tread surface that connects them, so that, where necessary, the structural components can be easily stacked on top of each other, and a high elasticity of the structural components is ensured in the event of expansion due to heat. Thanks to the trapezoid shape, the stackability of the multipurpose structural components is ensured, which leads to a considerably reduced transport effort, as the structural components can be shipped in a very tightly packed manner. Accordingly, the embodiment with the trapezoid hollow outer walls also serves for transport optimization.

The embodiment of the invention in which the hollow exterior wall tapers off from the bottom up also leads to a simplification from the injection molding or molding technological perspective, since the multiple-purpose structural component made of plastic material can be removed from the mold in an easier manner.

If the multipurpose structural component is used as a component of a side fortification for road ditches or in uneven terrain, it is useful to also form a holding device inside at least one feed-through, with the holding device having a feed-through into which a ground anchor or the like can be inserted.

In order to avoid any unintended displacement of the filling elements when the structural component is used as a walkable element having fillings of stones or tiles or soil or gravel, and it is subjected to loads, expediently the structural component has inner walls extending across the entire surface that form smaller reception areas with at least one drainage opening being provided therein.

By using plastic materials, a high mechanical stability as well as acid and weather resistance of the structural component is ensured, wherein the optical and haptic impression that is created is that of a paving/tiling laid out inside a bed.

The design of the exterior frame as a double wall that tapers off in a trapezoid manner facilitates an elastic compensation for expansions which the structural component arrangement comprised of multiple interconnected structural components may be subjected to due to temperature fluctuations or also due to loads, and any disadvantageous effect on the same is avoided in this manner.

Due to this special converging shape of the exterior frame walls, disadvantageous force conditions are avoided when loads act on the structural component arrangement, i.e., no undesired pressure on the structural component arrangement takes place as the loading occurs.

In order to avoid that the filling elements are removed or that they detach from the plastic material structural component, the double wall exterior frame parts can be designed in such a manner that their interior frame wall has at least one snap-in device for step plates that are inserted into the structural component and formed in a corresponding manner. After the filling element, e.g., a paving stone or a glowing stone, has been inserted, it is locked in inside the plastic material grid and can neither bulge nor can it be easily removed. In this manner, a simple, and where appropriate—also exchangeable, filling of the structural component arrangement, such as, e.g., with standardized shaped stones or paving stones, is ensured according to the invention.

In the following, the invention is explained in more detail based on preferred embodiments—to which it is by no means limited, however—with reference to the accompanying drawings.

DETAILED DESCRIPTION OF THE INVENTION

In the following, identical reference numbers refer to identical features in the individual figures. For reasons of clarity, features that appear multiple times in the individual figures are identified by the respective reference number only once.

Figure 1:
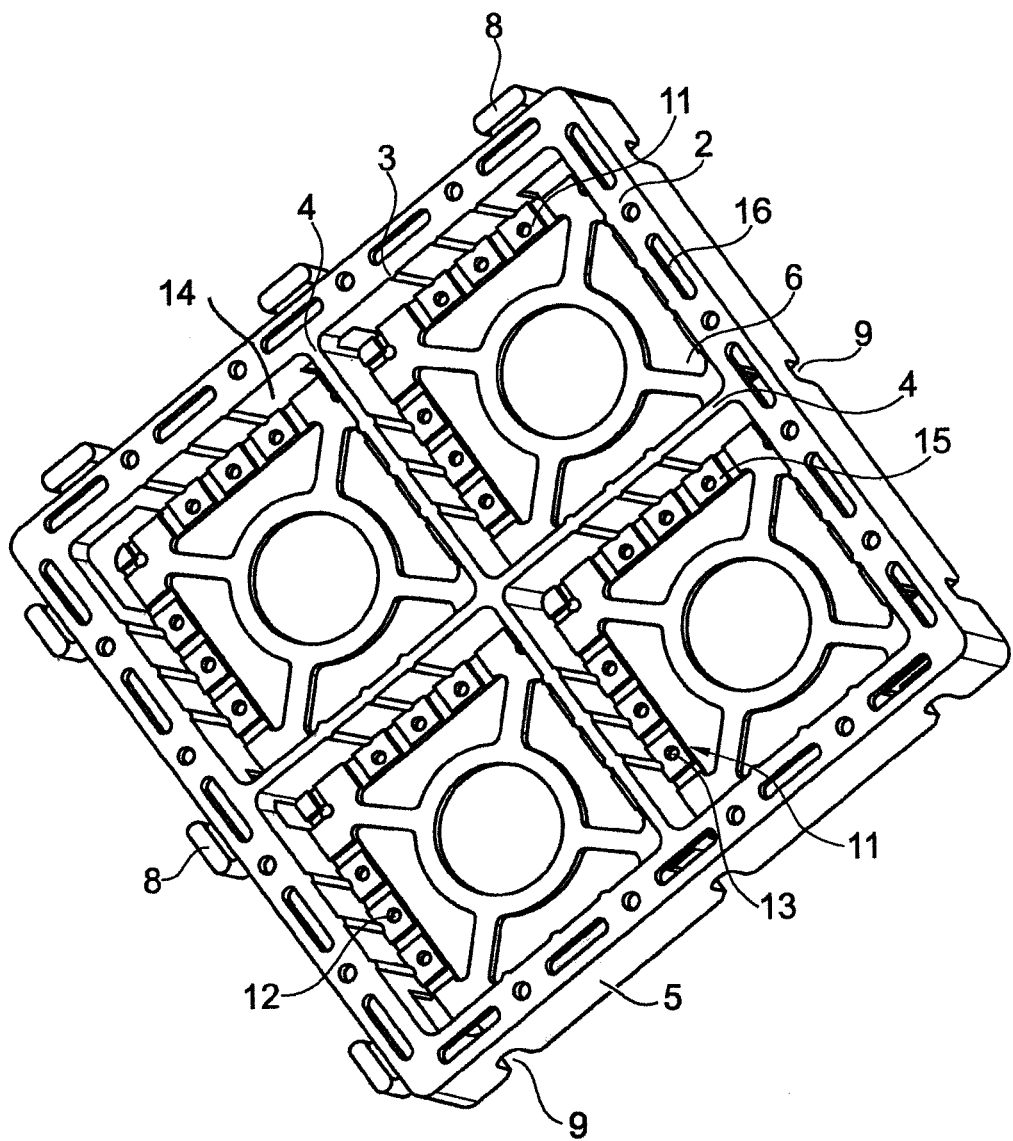
FIG. 1 is a perspective top view of an embodiment of a structural component according to the invention.

Reference number 1, in FIG. 1, indicates an embodiment of the structural component in its totality. The structural component comprises a hollow exterior frame 2, which can be square-shaped. In this embodiment, this hollow exterior frame 2, which comprises the exterior frame inner wall 14, exterior frame outer wall 5 and the tread surface 15, is connected at its internal side with multiple inner walls 3 (e.g., transverse walls as well as longitudinal walls) that divide the structural component 1 into individual cells. Here, lead-throughs 9 in the proximity of the transverse walls/longitudinal walls 3 in the hollow exterior frame outer wall 5 are used as the coupling device. Interior support frames 11 for filling elements are provided at the inner walls 3, 14. The fields that are thus created may, e.g., hold conventional paving stones, shaped stones of any kind, wood-block paving stones, rubber plates, plant containers or planted containers etc. as filling elements.

Coupling devices are positioned as hook parts 8 at the exterior frame lateral surfaces 5, which are located at the top and to the left in FIG. 1. The lead-throughs 9 inside the outer walls 5 of the neighboring structural component are provided in such a manner that they are placed at the same level as the hook parts 8, which are embodied so as to be open towards the bottom side in the case of the embodiment according to FIG. 1. This construction ensures that two structural components 1 can be connected together at adjoining external side surfaces 5 at the respective hook part 8 and feed-through 9. The arrangement of the individual lead-throughs is illustrated in FIG. 1.

Figure 2:
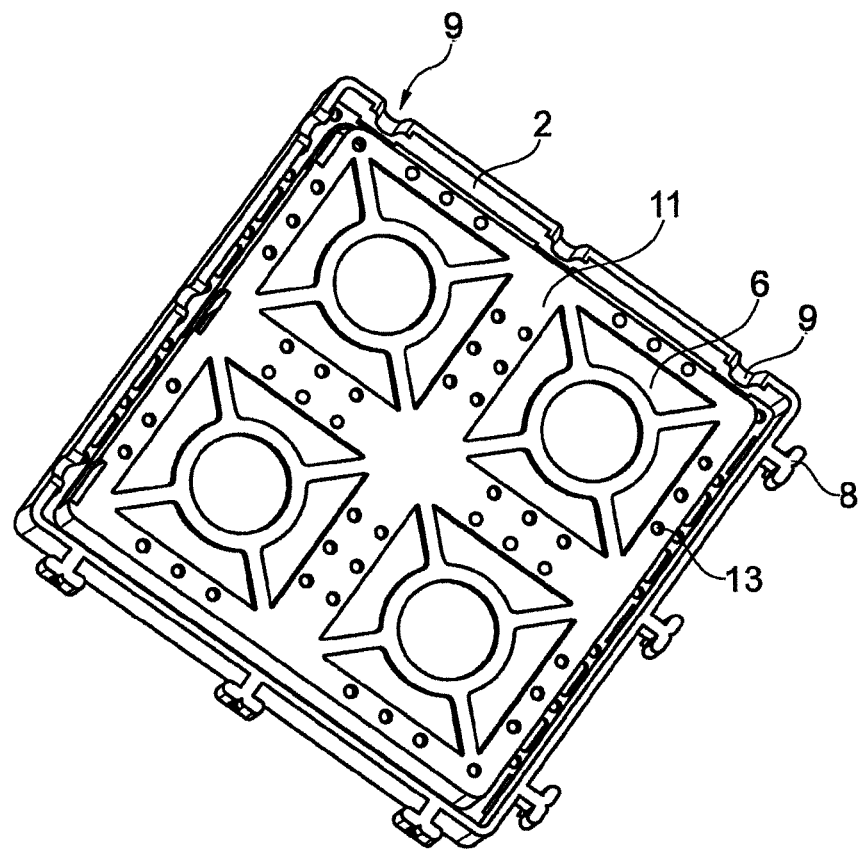
FIG. 2 is a perspective bottom view of the structural component according to FIG. 1

FIG. 2 shows a bottom view of the structural component according to FIG. 1. Here, the lead-throughs 9 are open from the bottom side, as are the cell-like lead-throughs 6 in the bottom of the structural component 1. Also inside the support frames 11, passage openings 12 are provided for better water-draining, which are inserted into elevated areas 12 of the support frames 11 in this embodiment, as can be seen in FIG. 1. For the purpose of water-draining, rib-like spacers 3 for the inserted filling bodies are also provided on the walls 14, 4 inside the frame. In this manner, it is avoided that the filling bodies rest directly against the inner walls of the structural component 1, thus facilitating a good draining of the liquid along the walls. It is particularly preferred that the drainage openings of the structural component are provided with walls, which, on the one hand, avoid any slipping on the structural components and, on the other hand, prevent any clogging of the drainage openings.

Figure 3:
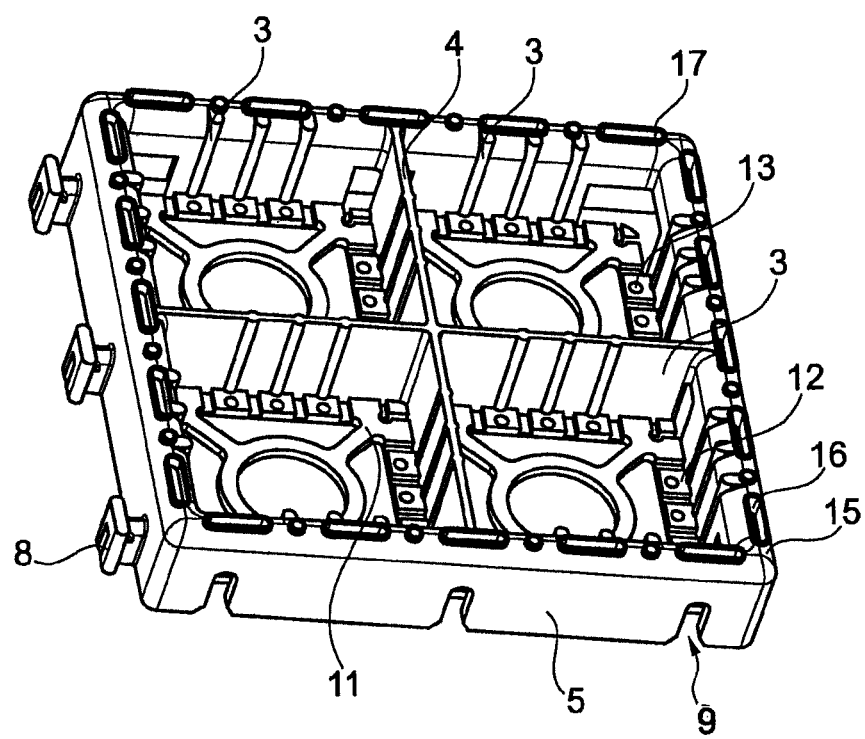
FIG. 3 is a perspective top view of the structural component according to the invention as seen obliquely from above.

FIG. 3 shows the embodiment of FIG. 1 in a lateral perspective view, wherein an embodiment of the exterior frame inner wall 5 can be clearly seen, which has recesses for the hooks 8 in the area of the lead-throughs 9 inside of which the front area of the hook is located. The lead-throughs 9 can be clearly seen in the exterior frame outer wall 5, through which the hooks 8 of an adjacent structural component 1 can be hooked in.

Figure 4:
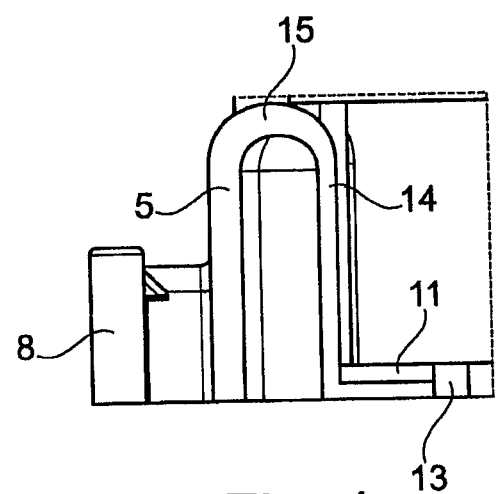
FIG. 4 is a detail of a cross section through the double wall area of a multipurpose structural component with an integrally formed hook part as well as a support frame.

FIG. 4 shows in detail a cross section through the double wall area of a structural component 1 with integrally formed hooks 8 and support frames 1. It can be seen that an opening 13 is provided in the support frame 11 and that the hollow exterior frame double wall 2 has approximately the width of a hook part 8.

Figure 5:
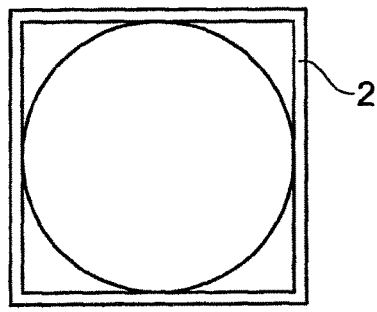
FIG. 5 is a top plan view of another embodiment of the structural component according to the invention without inner walls and filled with a round stone.

FIG. 5 schematically shows a top view onto another embodiment of the structural component according to the invention without inner walls, with the connection elements not being shown, and with the structural component being filled with a round stone without inner walls. Here, too, simple usability and water-draining are ensured.

Figure 6:
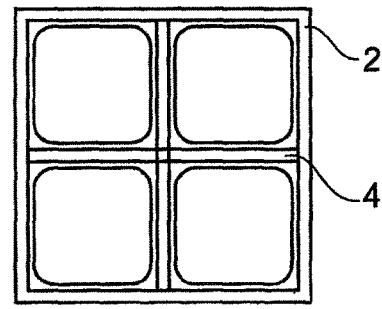
FIG. 6 is a top plan view of another embodiment of the structural component according to the invention with two inner walls, as shown in FIG. 3, and filled with 4 paving stones.

FIG. 6 is a schematic top view of an embodiment of the structural component according to the invention with inner walls and filled with customary square paving stones.

Figure 7:
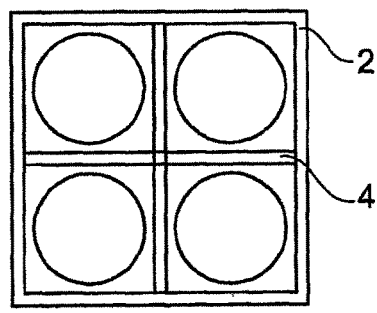
FIG. 7 is a top plan view of yet another embodiment of the structural component according to the invention without inner walls and filled with 4 round stones.
Figure 8:
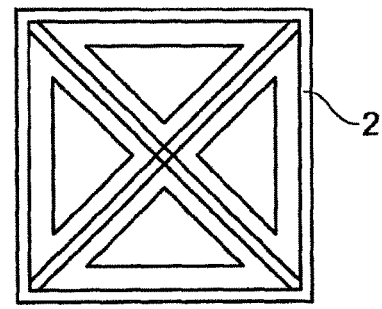
FIG. 8 is a top plan view of another embodiment of the structural component according to the invention with diagonally extending inner walls and filled with triangular stones.

FIG. 7 shows a schematic top view of another embodiment of the structural component according to the invention with inner walls 4, filled with round stones, and FIG. 8 shows a top view of another embodiment of the structural component according to the invention with diagonally extending inner walls, and filled with triangular filling bodies.

Figure 9:
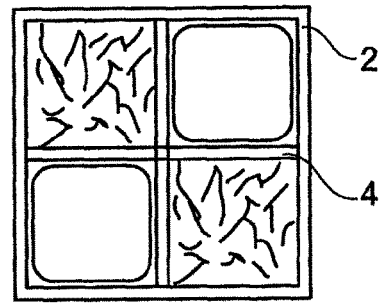
FIG. 9 is a top plan view of another embodiment of the structural component according to the invention with two inner walls and filled with two paving stones and two plant containers.
Figure 10:
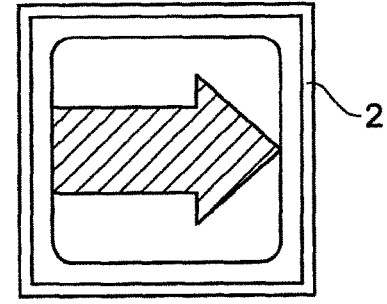
FIG. 10 is a top plan view of still another embodiment of the structural component according to the invention without inner walls and filled with a marked paving stone.

FIG. 9 is a schematic top view of another embodiment of the structural component according to the invention with inner walls 4, and partially filled with stones and partially with plants. FIG. 10 is a top view of another embodiment of the structural component according to the invention 1 without inner walls or with inner walls 4 of a strongly reduced height, and with a marked stepping stone.

Figure 11:
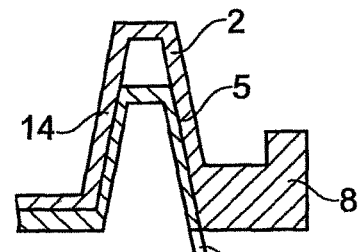
FIG. 11 is a cross-sectional view through an exterior frame area of two multipurpose structural components that are stacked on top of each other.

FIG. 11 shows a cross section through an exterior frame area of two structural components 1 that are stacked on top of each other and in which it can be seen that the structural components according to the invention can be stacked very easily, so that a considerably improved transport behavior is thus achieved due to improved nestability.

Figure 12:
FIG. 12 is a cross-sectional view taken along line A-A' through stacked multipurpose structural components with side walls that taper off in a trapezoid manner.

FIG. 12 shows a detail of a section through a double wall exterior frame 2 in which struts for delimiting its expansion capacity are provided. This can in particular become necessary in the case that an elastic synthetic material may expand too far due to disadvantageous environment conditions (such as, e.g., extremely high temperatures), or may break as a result of overexpansion at low temperatures. Limiting the expandability of the wall may also be necessary if the structural components 1 are subject to strong loads in chamfered areas.

Figure 13:
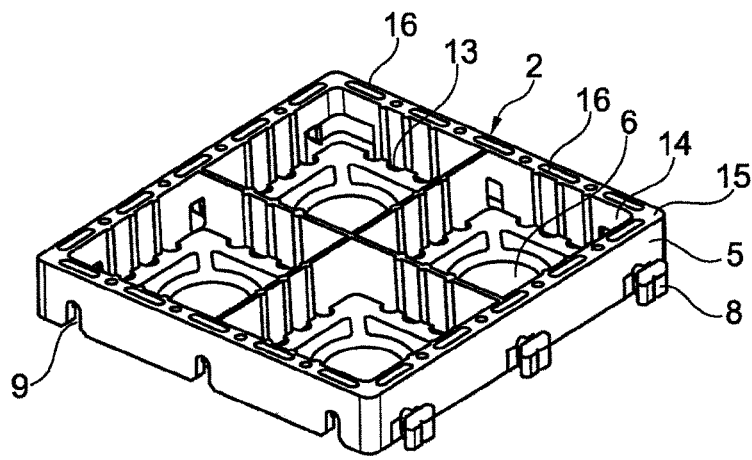
FIG. 13 is a perspective view of another embodiment of a structural component according to the invention seen obliquely from above.

FIG. 13 is a perspective view of another embodiment of a structural component according to the invention obliquely from above, wherein the openings 13 lie in the support frames 11 at the exterior frame inner walls 14 and are embodied without any elevations for the openings 13.

Figure 14:
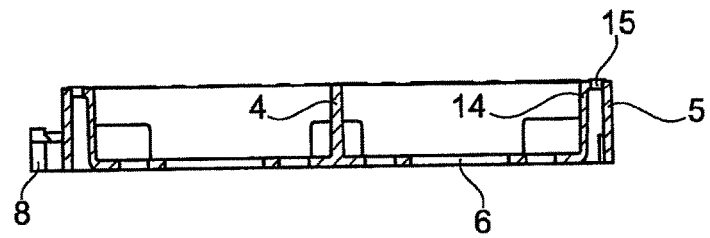
FIG. 14 is a cross-sectional view taken along line A-A' of FIG. 15.
Figure 15:
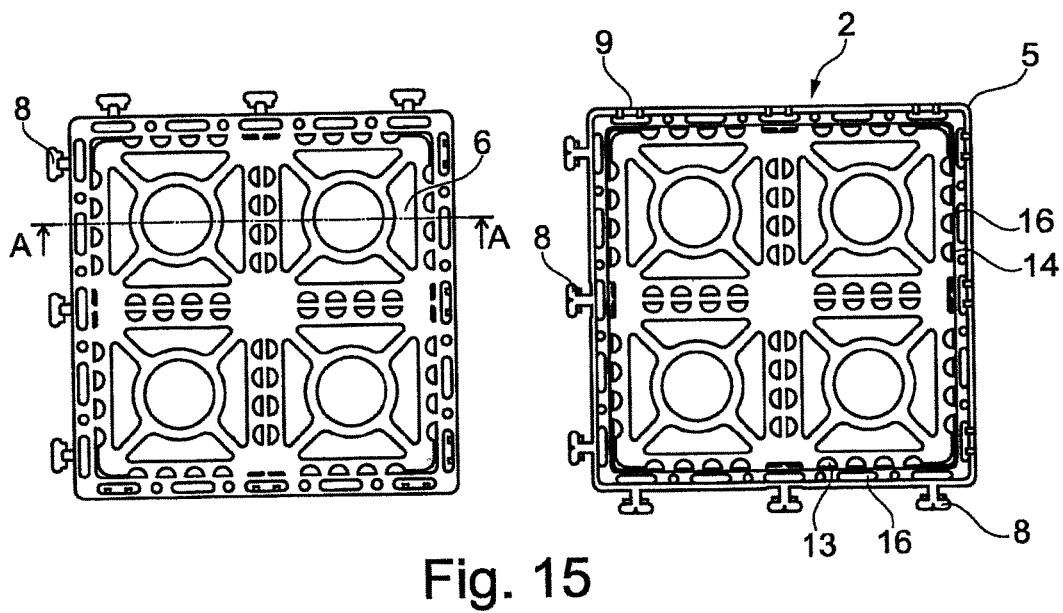
FIG. 15 is a top plan view of two structural components of the embodiment of FIG. 11 that are arranged next to each other for the purpose of being connected.

FIG. 14 is a cross section along the line A-A' of FIG. 15 through a structural component of the embodiment of FIG. 13 from which it can be clearly seen how the hollow outer walls 2 are designed in such a manner that they can receive hook elements 8. FIG. 15 shows a top view onto two structural components 1 of the embodiment of FIG. 13 that are arranged adjacent to each other for the purpose of being connected.

Figure 16:
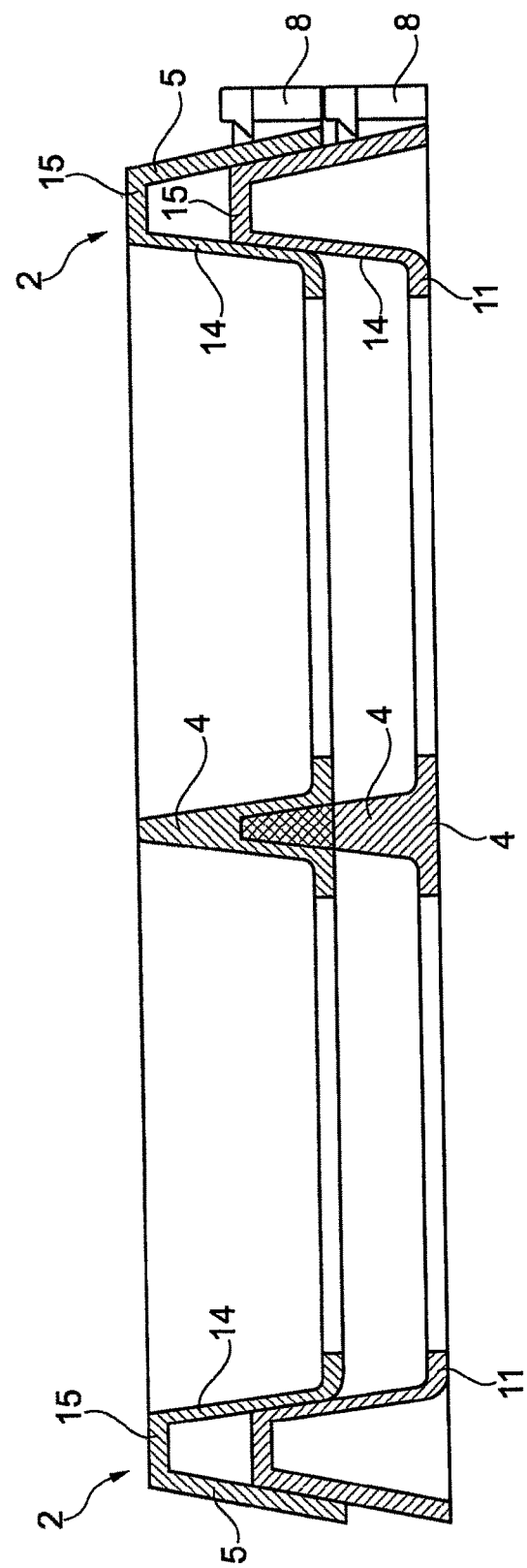
FIG. 16 is a cross-sectional view through multipurpose structural components made of plastic material that are stacked on top of each other.

FIG. 16 shows the nestability of the structural components 1 in a cross section through stacked structural components 1 having side walls 5, 14 that taper off in a trapezoid manner along the line A-A' of FIG. 13. It can be clearly seen how the double wall frames 2 mesh up to the height of the hook part 8, and thus strongly facilitate storing, shipping and handling of the structural components 1. Thanks to this advantageous nestability of both parts, the space requirements of the structural components are considerably reduced during transportation. This is eco-friendly and efficient particularly also for the reason that many transport trips can be avoided in this way.

Figure 17:
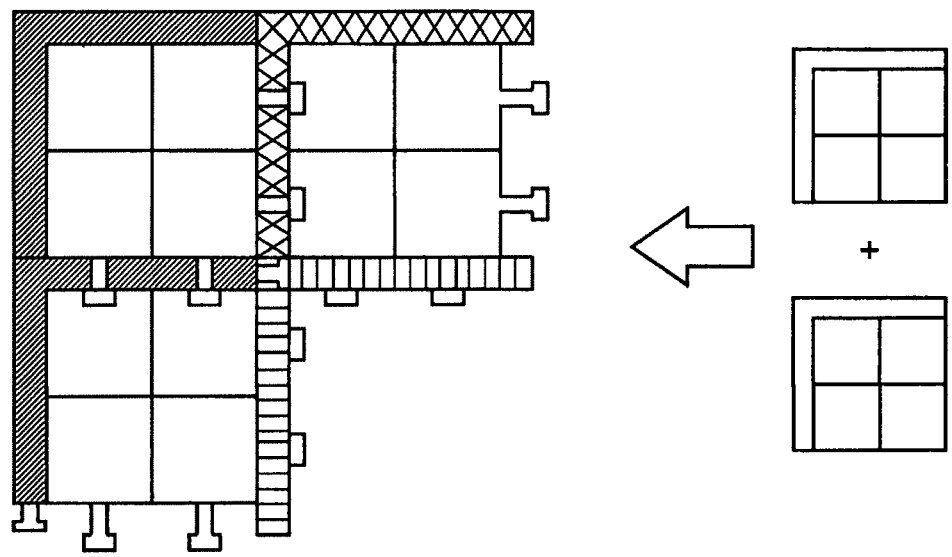
FIG. 17 shows planar placement of molded parts made of plastic material that have two adjoining double wall exterior frame parts and two edge areas without double wall exterior frame parts at their outer sides.

FIG. 17 schematically shows multiple multipurpose structural components that are coupled to each other and that respectively have only one angle-like double frame exterior part. Thus, when the multipurpose structural components 1 are coupled to each other, what results is not a doubled double frame, but a simple double frame, the filling space being defined by the coupled components instead of being within a single component as in the prior embodiments.

Figure 18:
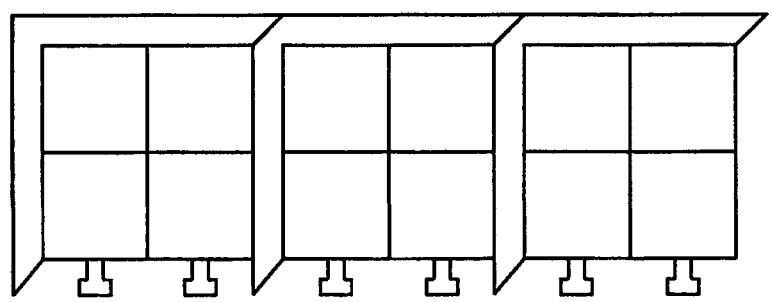
FIG. 18 shows another planar placement of molded parts made of plastic material, with their double wall exterior parts being chamfered in a bevel-shaped manner for the purpose of being connected to double wall exterior parts of further elements.

FIG. 18 schematically depicts another embodiment of multipurpose structural components with a non-circumferential double exterior wall. In this embodiment, the angle-like double frame exterior parts end in oblique end surfaces. In this manner, there are different options of attaching the structural components to each other as compared to the embodiment of FIG. 17, and there is also a larger common contact surface of the double wall end surfaces.

Figure 19:
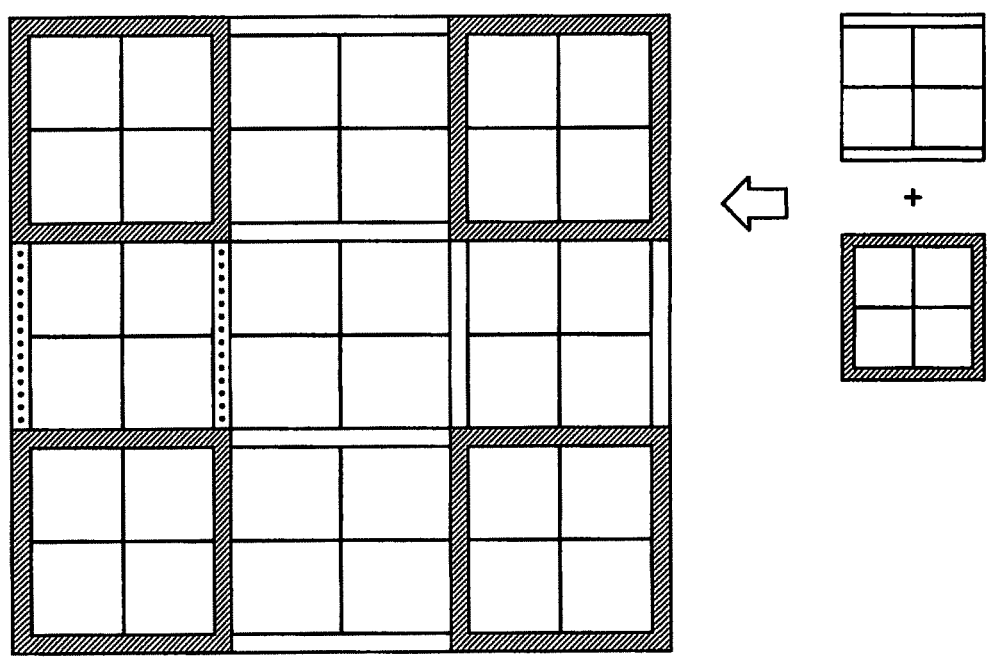
FIG. 19 is another embodiment of laid out molded parts made of plastic material, wherein molded parts having circumferential double wall exterior frame parts alternate with molded parts having double wall frame parts that extend in parallel to each other.

FIG. 19 shows an arrangement of different multipurpose structural components that are coupled to one another so as to form a surface. On the one hand, multipurpose structural components with a circumferential double wall frame are used, and on the other hand, such multipurpose structural components that only have two opposite double walls that are coupled to double wall surfaces of adjacent multipurpose structural components that have four walls. This embodiment uses less synthetic material and leads to a high share of filling element occupancy of the surface that is covered by the multipurpose structural components.

Figure 20:
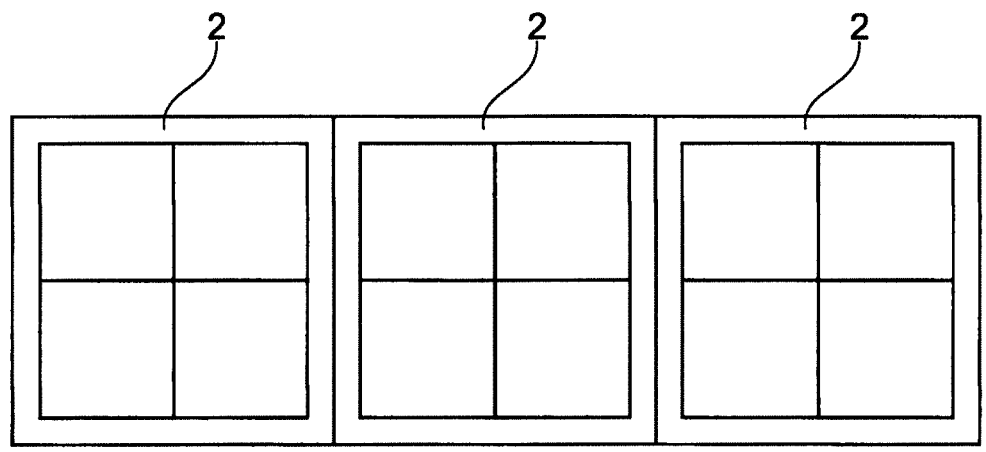
FIG. 20 schematically depicts a surface formed of multipurpose structural components that are embodied with circumferential double wall frame parts.

FIG. 20 explains how a surface is covered with multipurpose structural components 1 that are coupled to each other and have a circumferential double exterior frame. The adjoining double exterior frame walls of the parts can be clearly seen.

Figure 21:
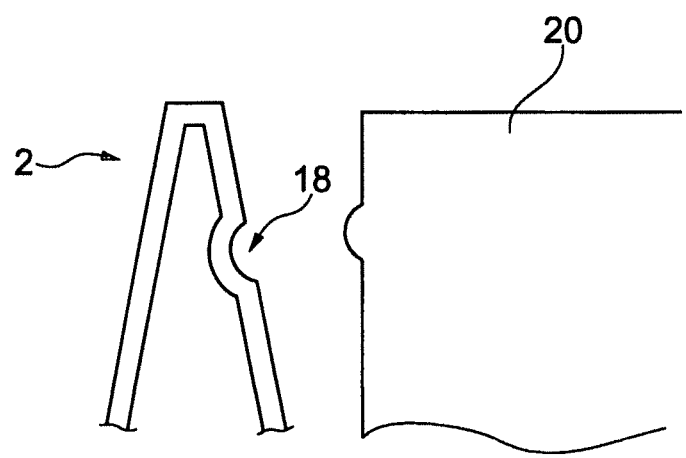
FIG. 21 is a detail of a section through a double wall with a snap-in device for a filling element.

FIG. 21 shows a detail of an embodiment of a double exterior frame with a snap-in device, which is shown schematically here as an indentation 18 in the inner wall of a double exterior frame part made of plastic. An elevation of the filling element 20 meshes into this indentation when the multipurpose structural component is installed, and thus, secures it against being tilted, pulled out, or stolen.

It is pointed out that, although the trapezoid cross-sectional shape and elasticity of the outer walls is advantageous in many cases, there may already be sufficient play for accommodating the expandability changes in the structural components due to the double walls 2 as well as the hooks 8 received therein. This depends on the circumstances in the individual case, on the material used, as well as on the environment conditions under which the structural components are laid out.

The multipurpose structural component 1 can be used as a component of the floor covering, e.g., of a stable, a public surface, of paths (in particular also paths for golf carts or riding grounds, or of a moisture-draining surface), as liquids can be quickly drained thanks to the feed-throughing openings in the structural components.

In order to lay out the multipurpose structural components according to FIG. 1, adjacent structural components 1 are pushed together with a certain amount of physical effort with the front end hook part 8 being inserted into the open side of the feed-through 9, so that multiple structural components are connected to form a structural component compound. Insertion of the front end of hook parts 8 into the openings 9 inside the frame outer walls 5 causes two adjacent structural components to lock, so that they can only be unlocked if an increased force is exerted.

According to the invention, the structural components are, e.g., used for stabilizing a surface, such as, e.g., a parking lot, a garage entrance, or another kind of surface that is to be covered with walkable structural components. For this purpose, the structural components have to be laid out in a one-dimensional manner as a composite, and are subsequently filled with stones or tiles, or the like. The structural components according to the invention can be combined into transportable stacks, with the double walls meshing, so that the structural components can be easily stacked, transported in this state, and placed on site by being connected as structural component compounds.

However, the structural components are also suitable for being laid out in paddocks, outdoor facilities of riding grounds, soccer fields and other kinds of sports fields. Thanks to the elastically compressible double walls, the side walls can also accommodate strong expansions, e.g., in the event of different thermal expansions. Here, it is preferable for some applications if closed containers are used that can serve as a liquid reservoir, and thus avoid any drying out and undesired dust formation for a longer time. When it comes to the (temporary) construction of transportable/temporary buildings, such as stables or the like, where a quick draining of urine or other liquids is desired, the cells are embodied so as to be open at the bottom. In any case, the astonishing elasticity of the structural component represents an advancement and preserves the natural underfoot feeling of the subsurface it is placed upon. Usually, paving does not yield. Now, this can be achieved to a certain degree thanks to the structural component according to the invention.

Also, the inner walls 4 of the multipurpose structural components 1 preferably taper off from the standing surface upwards. For one thing, unproblematic filling of the multipurpose structural components 1 with molded parts is obtained in this manner. Moreover, any lifting of a structural component compound, which may, e.g., be filled with stones, due to disadvantageous force conditions during the loading is avoided in this embodiment, i.e., no undesired lifting pressure is created at the time the load is acting. The support surfaces are enlarged as compared to known structural components 1, and the structural component compound can be filled more easily. In addition, the special shapes of the support frame as well as of the hollow outer walls have the advantage that structural components provided with molded parts can be handled more easily, and that, where a planting unit is used, it cannot easily fall through inside the structural component compound or the structural component arrangement. These special structural components can be manufactured so that the structural component is manufactured in one mold half in its entire depth, with the other mold half merely forming the end cover.

Although the invention has been described based on a preferred embodiment of a structural component, it is by no means limited to the same, but rather to what the person skilled in the art implicitly understands from reference to the description and the figures.

The invention claimed is:

1. Multipurpose structural component made of plastic material, comprising
    a flexible circumferential double wall exterior frame, formed by double wall exterior frame parts comprised of an exterior frame wall, an interior frame wall that extend the full height of the multipurpose structural component, and a tread surface that connects an upper end of the exterior and interior frame walls to each other, wherein the tread surface has drainage openings formed therein which communicate a space between exterior and interior frame walls that is open at a lower end thereof,
    at least one coupling device for connecting two adjacent structural components being provided at external side surfaces of the exterior frame wall, and
        inner support floor frame connected to the interior frame wall for stabilizing and supporting at least one incompressible filling element inserted into a receiving space bounded by interior frame wall, the double wall exterior frame being elastically flexible for compensating for expansion and contraction of the at least one incompressible filling element inserted into the receiving space,
        wherein the at least one coupling device comprises at least one hook part and a feed-through that is positioned at the same level as the at least one hook part at a side of the exterior frame wall opposite the hook part, the feed-through being open at a lower edge of the exterior frame wall, wherein the hook parts are located at the lower edge of the exterior wall, the hook parts of one structural component being engageable in a feed-through of another structural component to be connected with a bottom side of the hook part flush with the lower edge of the exterior frame wall so that the hook part is able to be held in the feed-through by ground contact.

2. Multipurpose structural component according to claim 1, further comprising inner walls which divide inside of the exterior frame into a pattern of cell-shaped lead-throughs; and wherein the inner support floor frame comprises floor cross struts extending between the interior frame walls as means for stabilizing and supporting at least one filling element when inserted into the multipurpose structural component.

3. Multipurpose structural component according to claim 1, wherein spacer elevations are formed on the inner frame walls for facilitating draining of water along an inserted filling element.

4. Multipurpose structural component according to claim 1, wherein the double wall exterior frame parts taper in a frustoconical manner in a direction toward the tread surface.

5. Multipurpose structural component according to claim 1, wherein connecting struts are provided between the inner and outer frame walls of double wall exterior frame parts.

6. Multipurpose structural component according to claim 1, wherein the structural component is forms of a thermoplastic plastic material, selected from the group consisting of unprocessed plastic material, recycled plastic material, fiber-reinforced plastic material, filled plastic materials, biodegradable plastic materials, and mixtures and combinations thereof.

7. Multipurpose structural component according to claim 1, further comprising water-draining openings in at least one surface.

8. Multipurpose structural component according to claim 1, wherein the double wall exterior frame parts are elastically compressible and expandable.

9. Multipurpose structural component according to claim 1, wherein the inner frame wall of the double wall exterior frame parts has at least one snap-in device for holding step plates inserted into the structural component.

* * * * *